United States Patent [19]

Barishpolsky et al.

[11] 4,450,430

[45] May 22, 1984

[54] LANE CHANGE GUIDANCE SYSTEM

[76] Inventors: Boris M. Barishpolsky, 712 Farmington Ave., Apt. 304, West Hartford, Conn. 06119; Eugene L. Filstein, 178 Brunswick Ave., West Hartford, Conn. 06107

[21] Appl. No.: 257,120

[22] Filed: Apr. 24, 1981

[51] Int. Cl.³ ............................ G08G 1/00; B60Q 1/34
[52] U.S. Cl. .................................. 340/904; 340/52 H; 340/73; 340/901; 367/909
[58] Field of Search ................... 340/73, 52 H, 32–34; 367/93, 13, 112, 909; 180/167, 169; 179/184, 188

[56] References Cited

U.S. PATENT DOCUMENTS

| | | | |
|---|---|---|---|
| 2,325,424 | 7/1943 | Rettinger | 179/184 |
| 2,974,304 | 3/1961 | Nordlund . | |
| 3,158,835 | 11/1964 | Hipkins | 340/34 |
| 3,601,792 | 8/1971 | Murray | 340/34 |
| 3,681,750 | 8/1972 | Larka . | |
| 3,732,536 | 5/1973 | Larka . | |
| 3,760,343 | 9/1973 | Auer | 367/93 |
| 3,786,507 | 6/1974 | Hurd . | |
| 3,842,397 | 10/1974 | Sindle . | |
| 4,015,232 | 3/1977 | Sindle . | |
| 4,026,654 | 5/1977 | Beaurain . | |
| 4,028,662 | 6/1977 | Young . | |
| 4,143,264 | 3/1979 | Gilbert et al. . | |

*Primary Examiner*—James J. Groody

[57] ABSTRACT

A diaphragm-type transducer assembly is mounted on the rear of an automobile to transmit ultrasound into left- and right-hand target regions near the automobile. Spoilers are mounted adjacent to the transducer diaphragms to disrupt the air flow around them and prevent negative pressure that could adversely affect the operation of the transducer. The circuitry for driving the transducers includes relays in the signal-lamp circuit to detect when the turn signal is turned on, and it only transmits ultrasound pulses in response to signal-lamp actuation. The system initially "listens" for objects outside the target region in order to test the circuitry, but it subsequently responds only to objects within the target region.

15 Claims, 8 Drawing Figures

LANE CHANGE GUIDANCE SYSTEM

BACKGROUND OF THE INVENTION

The present invention relates to object-detection devices. It is particularly concerned with ultrasonic devices used on automobiles.

The pursuit of highway safety has led to numerous proposals for devices to be used in automobiles to detect the proximity of other vehicles. Some of these devices are used to detect the presence of a vehicle in front of the car, thereby detecting an impending crash and causing the brakes to be applied automatically. Others have been directed to the detection of vehicles in "blind spots" so that the driver can be warned not to turn into the path of an oncoming vehicle.

The use of ultrasound for object detection has been proposed for both types of devices, and ultrasound has been proved effective as a means for detecting objects. However, in contrast to those systems in which detection of an object automatically results in, say, application of the car's brakes, those systems in which the driver of the car is to be alerted must do more than merely detect the other vehicles accurately. Such systems must additionally operate effectively as information systems, presenting information to the driver in such a way that he can use it effectively.

It is accordingly an object of the present invention to notify the driver of the presence of vehicles in his "blind spot" only at those times when he is most likely to need such information. Another object is to present the information in such a manner that the driver can easily confirm the operability of the system and can thereby rely on the system with confidence. A further object is to enable the use of numerous ultrasonic frequencies even at high automobile speeds.

SUMMARY OF THE INVENTION

Certain of the foregoing and related objects are achieved in an ultrasonic object-detection device for an automobile having left and right turn-signal lamps connected by left and right signal lines, respectively, to a turn-signal activation device having a neutral state and left-turn and right-turn states in which it applies actuating signals to the left and right signal lamps, respectively, along the left and right signal lines. The ultrasonic object-detection device includes ultrasonic signal means and alarm means. The ultrasonic signal means is selectively operable to transmit ultrasonic pulses into left and right target regions disposed to the left- and right-hand sides of the automobile, respectively, and to detect echoes of the pulses from objects in the left and right target regions. The ultrasonic signal means generates electrical echo-reception signals to indicate the reception of ultrasonic echoes. The alarm means is electrically connected for reception of the echo-reception signals from the ultrasonic signal means and is operable in response to the echo-reception signals to present an alarm signal to the driver of the automobile.

The object-detection device further includes circuit means electrically connected to the left and right signal lines for detecting actuating signals on them and operating the ultrasonic signal means to transmit ultrasonic pulses to the left target region when actuating signals are trammitted on the left signal line. Similarly, it causes the ultrasonic signal means to transmit ultrasonic pulses into the right target region when actuating signals are transmitted on the right signal line. The alarm means thereby notifies the driver of the presence of objects in the right and left target regions when the turn-signal switching device has been operated to its right- and left-turn states, respectively.

The ultrasonic signal means typically includes left and right transducer means and signal-processing means electrically connected to the transducer means for selective excitation of the transducer means and reception of signals from it. The circuit means for detecting actuating signals typically includes left and right relays electrically connected to the left and right signal lines, respectively, for actuation of the left and right relays upon transmission of actuating signals o the left and right signal lines, respectively. In such an arrangement, the signal-processing means includes contacts of the left and right relays that are operable by actuation of the left and right relays to permit signal transmission between the signal-processing means and the left and right transducers. Deactivation of the left and right relays prevents signal transmission between the signal-processing means and the left and right transducers, respectively. In the illustrated embodiment, the signal-processing means includes clock means operable by application of enabling signals to it to produce timing pulses at regular intervals. The signal-processing means applies electrical excitation signals to the transducer means for generation of ultrasonic pulses whenever the activation device is in its left-turn or right-turn state.

Various objects are achieved by an ultrasonic device used in an automobile that has at least one signal lamp for indicating a direction in which the automobile is to be driven and includes a manual activation device that is manually operable to selectively activate the signal lamp. These objects are achieved when the ultrasonic device includes ultrasonic transmitter/receiver means, alarm means, and enablement means. The transmitter/receiver means is connected for operation by the activation device to transmit ultrasonic pulses that travel through the target region without reaching the ground and that reach the ground after traveling beyond the target region. The transmitter/receiver means receives ultrasonic echoes of the ultrasonic pulses and produces electrical echo-reception signals representing the time of reception of the ultrasonic echoes. The alarm means is electrically connected to receive the echo-reception signals and is operable by application of enablement signals to it to present an alarm indication to the driver of the automobile in response to the electrical echo-reception signals.

The enablement means has test and non-test modes and assumes its test mode in response to operation of the manually operable activation device to activate the signal lamp. It thereafter assumes its non-test mode automatically. It is electrically connected for application of enablement signals to the alarm means, and, in response to transmission of ultrasound pulses, it applies an enablement signal to the alarm means that continues long enough during the test mode to enable the alarm means to present an alarm indication to the driver of the automobile in response to electrical echo-reception signals that result from echoes from the ground outside the target region. In the non-test mode, the enablement means responds to pulse transmission by applying enablement signals that only last long enough to enable the alarm means to present an alarm indication in response to echo-reception signals that result from echoes from objects within the target region. As a result, the alarm means presents an alarm indication to the driver of the automobile during the test mode whenever a pulse is transmitted and the ultrasonic device is working properly. During the non-test mode, on the other hand, an alarm indication is not presented unless there is an object in the target region.

In the illustrated embodiment, the enablement means includes a non-test monostable multivibrator that is connected for triggering upon pulse transmission and has a period equal to that required for sound to travel from the transmitter/receiver means to the end of the target region and back again. The output port of the non-test monostable multivibrator is electrically connected for application of its output to the alarm means as an enablement signal. The enablement means of the illustrated embodiment also includes a test monostable multivibrator with an output port connected for application of its output as an enablement signal to the alarm means. The enablement means also includes a timing monostable multivibrator whose unstable state has a period extending through a plurality of ultrasound pulses. The timing monostable multivibrator is connected to receive as its input the output of the test monostable multivibrator. The inport port of the test monostable multivibrator is connected to receive as its inputs the outputs of the non-test and timing monostable multivibrators, the inputs being gated for triggering of the test monostable multivibrator by the output of the non-test monostable multivibrator only during the stable state of the timing multivibrator. The period of the test monostable multivibrator is long enough to enable the alarm means to present an alarm indication in response to electrical echo-reception signals resulting from echoes from the ground outside the target region. Initial triggering of the non-test monostable multivibrator thereby triggers the test monostable multivibrator to enable response of the alarm means to echoes from beyond the target region, but the output of the test monostable multivibrator triggers the timing monostable multivibrator to prevent further triggering of the test monostable multivibrator in response to signals from beyond the target region until the timing monostable multivibrator resumes its stable state.

Preferably, the transmitter/receiver means includes clock means for producing pulses at regular intervals when it is enabled. The transmitter/receiver means transmits an ultrasonic pulse on each pulse of the clock means, and the clock means is electrically connected for enablement by operation of the manual activation device.

Certain objects are achieved when the ultrasonic object-detection device includes alarm means, ultrasonic transducer means, and signal-processing means. The alarm means is operable by application of electrical signals to it to present an alarm indication to the driver of the automobile. The ultrasonic transducer is mounted on the automobile and includes diaphragm means. It is operable by application of excitation signals to it to vibrate the diaphragm means at ultrasonic frequencies to produce ultrasound waves. The diaphragm means vibrates in response to reception of ultrasound echoes, and the transducer means generates echo electrical signals in response to such vibration.

A signal-processing means is electrically connected to the transducer means for application of electrical excitation signals to it and reception of electrical echo signals from it. It is electrically connected to the alarm means for application of electrical signals to it. The signal-processing means applies excitation signals to the transducer means to produce ultrasound waves at a plurality of ultrasonic frequencies. Upon reception of at least some echo electrical signals from the transducer means, it applies electrical signals to the alarm means to present an alarm indication to the driver of the automobile. The object-detection device further includes airflow disruption means mounted on the automobile adjacent to the diaphragm means and positioned for avoidance of negative pressure on the diaphragm means caused by rapid air flow resulting from motion of the automobile.

In the preferred embodiment, the object-detection device further includes heater means disposed adjacent to the diaphragm and operable to maintain the temperature in the vicinity of the diaphragm high enough to keep it free of ice. The heater is connected to the electrical system of the automobile for powering of the heater means by the automobile voltage source. The heater means includes voltage-sensing means for sensing the voltage of the automobile voltage source, and it heats the region of the diaphragm only when the sensing means detects a voltage indicating that the automobile engine is running.

The diaphragm in the illustrated embodiment is driven electrostatically.

The description below also teaches a method of ultrasonically detecting the presence of objects within the target region in the vicinity of an automobile. The method includes providing ultrasonic transmitter/receiver means operable to transmit ultrasonic pulses that travel through the target region without reaching the ground and that reach the ground after traveling beyond the target region. The transmitter/receiver means receives ultrasonic echoes of the ultrasonic pulses and produces electrical echo-reception signals representing the time of reception of the ultrasonic echoes. The method also includes the step of providing alarm means electrically connected for reception of the echo-reception signals and operable to present an alarm indication to the driver of the automobile in response to the electrical echo-reception signals occurring within a first duration after transmission of the ultrasonic pulses that is equal to the time required for sound to travel from the transmitter/receiver means to the end of the target region and back again. The alarm means is also operable to present an alarm indication to the driver of the automobile in response to electrical echo-reception signals that occur within a second duration after pulse transmission that is long enough for the ultrasound pulse to travel from the transmitter/receiver to the ground outside the target region and back again.

The method includes operating the transmitter/receiver means and alarm means for transmission of an ultrasonic pulse and presentation of an alarm indication upon reception of an echo within the second time duration. An alarm is thereby presented to the driver of the automobile if the transmitter/receiver means and the alarm means are working properly. Finally, the method includes thereafter operating the transmitter/receiver means and the alarm means for transmission of a pulse and presentation of an alarm only upon reception of an echo within the first time duration. The transmitter/receiver means and alarm means are thereby tested initially for proper operation and then operated to detect only objects within the target region.

BRIEF DESCRIPTION OF THE DRAWINGS

Further features and advantages of the present invention are described below in connection with the accompanying drawings, in which.

DETAILED DESCRIPTION OF THE PREFERRED EMBODIMENT

Figure 1:
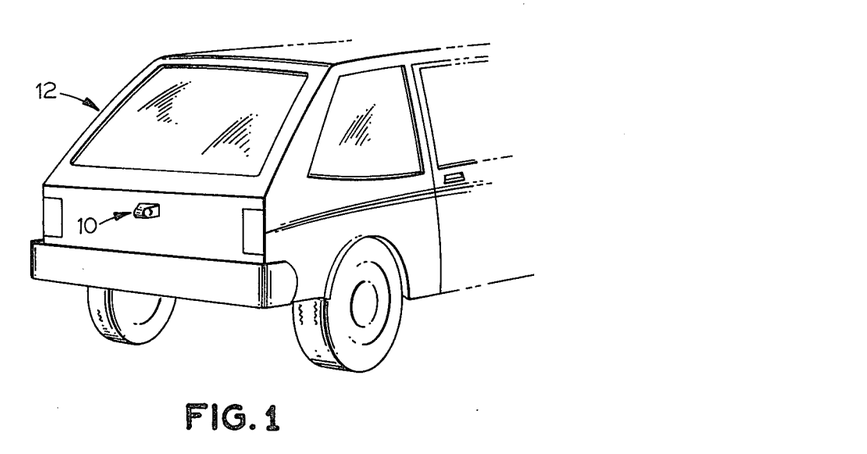
FIG. 1 is a perspective view of the rear of an automobile to which the transducer assembly used in the present invention is attached.
Figure 2:
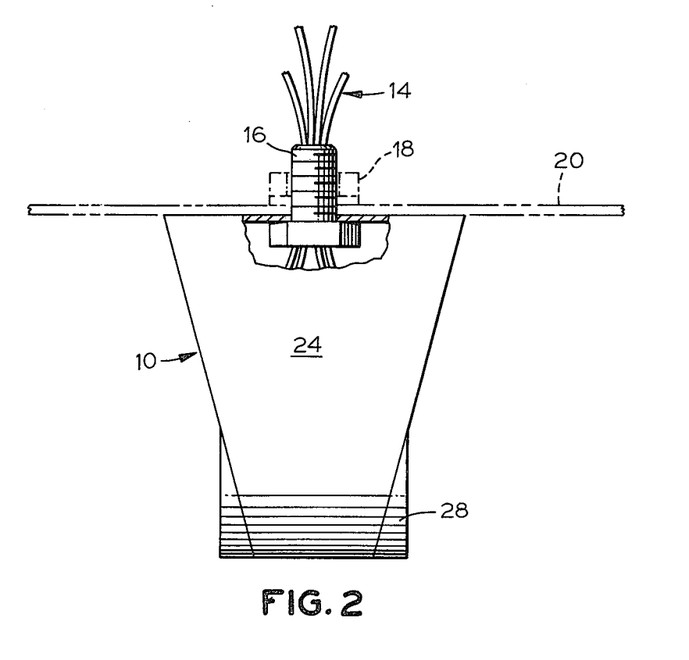
FIG. 2 is a plan view with parts broken away of the transducer assembly shown in FIG. 1.
Figure 4:
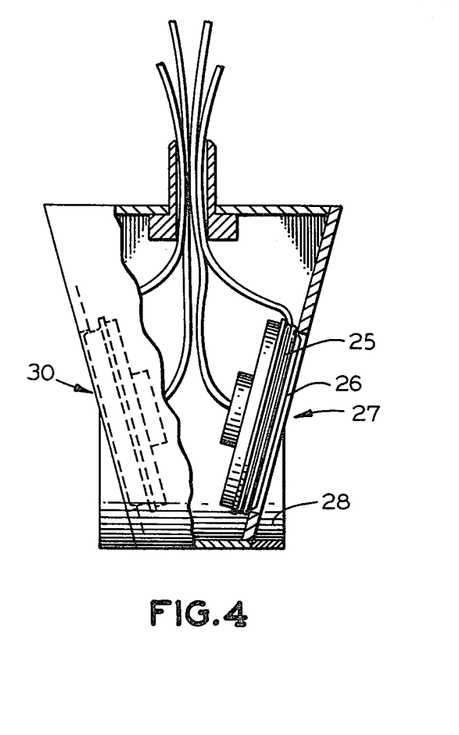
FIG. 4 is another plan view partly broken away to show the heater coil provided for one of the transducers.
Figure 6:
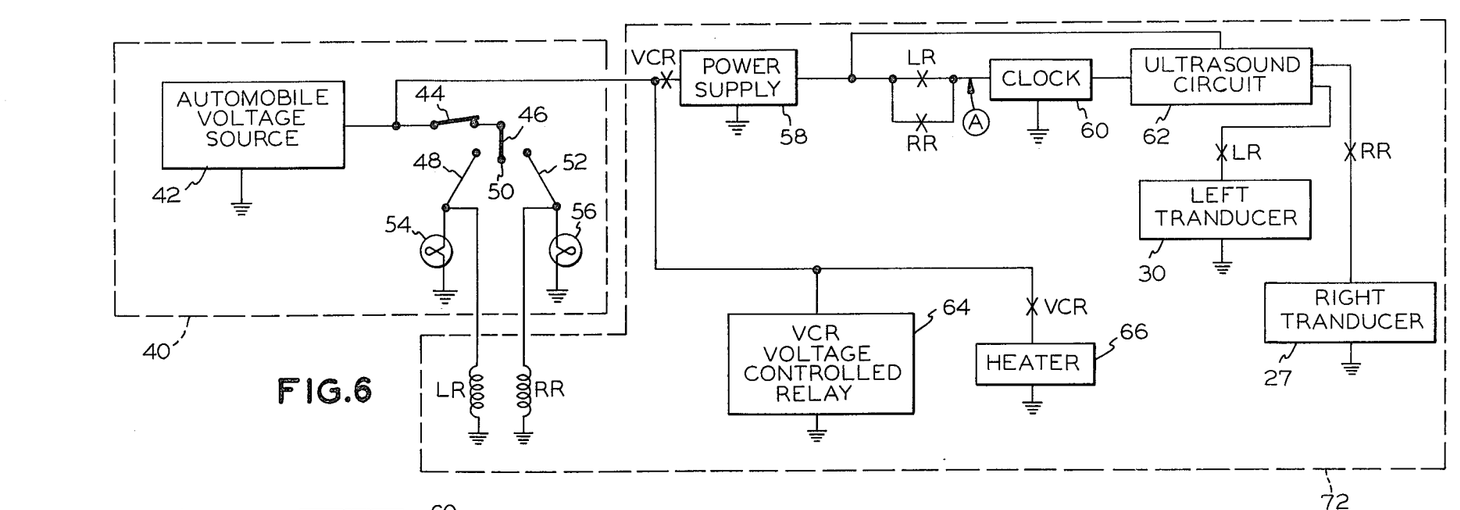
FIG. 6 is a block diagram of the electrical connections between the automobile electrical system and the circuitry of the ultrasonic system.
Figure 7:
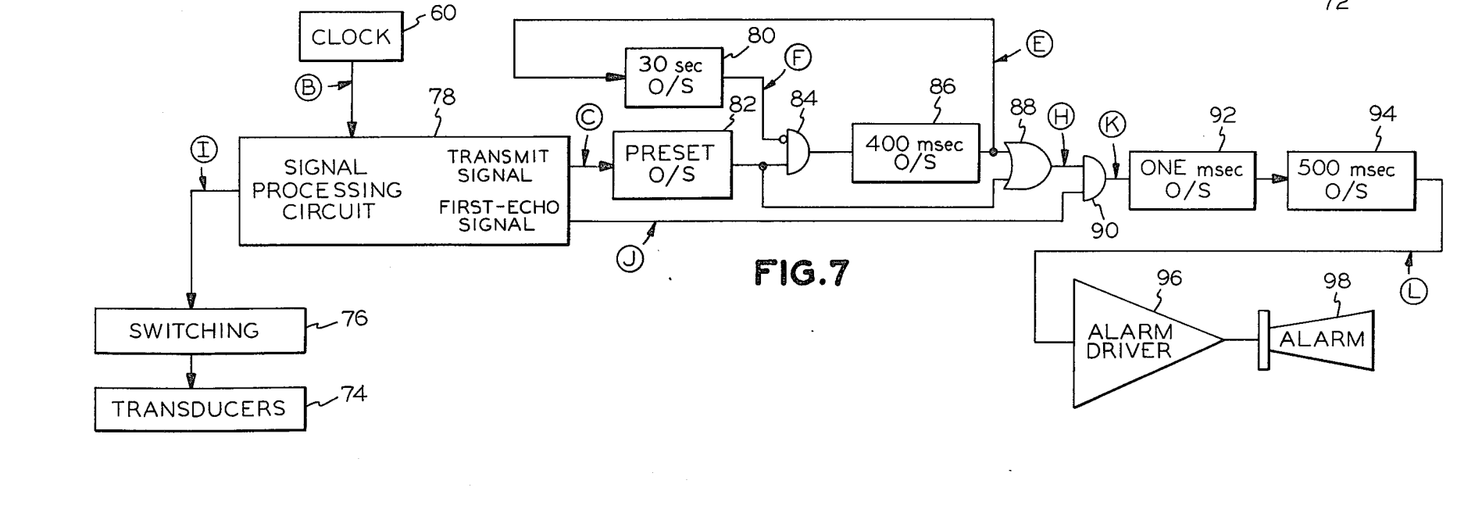
FIG. 7 is another block diagram, this one emphasizing the signal-processing aspects of the device.

An information system for informing the driver of the presence of other vehicles detected ultrasonically is depicted in the drawings. The system includes an ultrasonic transducer assembly mounted, for example, on the rear of a car as shown in FIG. 1 and providing two ultrasonic transducers aimed in different directions, as FIG. 4 shows. The transducers of the illustrated embodiment are electrostatically driven diaphragm-type transducers that can be driven at frequencies throughout a relatively wide range and thereby avoid the false indications that might otherwise result from absorption of a single frequency by the target object. To insure operation at high automobile speeds, a spoiler 28 is provided adjacent to the diaphragm to break up the air flow and prevent excessive negative pressure. FIGS. 6 and 7 show the electrical connections by which the device only operates when a turn signal has been activated, so information is only provided to the driver when he needs it. Furthermore, the timing of the device is so arranged that it initially "listens" for the ground outside the target region and provides an alarm signal in response to detection of echoes from the ground to insure the driver that the circuitry is working properly.

A more detailed review of FIGS. 1-4 reveals that the transducer assembly 10 can be mounted if desired on the rear door 20 or trunk lid, for example, of an automobile. The transducer assembly includes an irregularly shaped housing 24 having vertical side walls extending at a shallow angle to a vertical plane containing the longitudinal axis of the automobile. Mounted in the side walls are right and left transducers 27 and 30. These transducers are diaphragm-type transducers that are electrostatically driven and capable of producing ultrasound effectively at frequencies throughout a significant range. Transducers of the diaphragm type, however, are sometimes affected adversely by air flows that result in negative pressure at the diaphragm. Accordingly, a spoiler 28 in the form of a cylinder segment is provided adjacent to each diaphragm in order to disrupt the air flow and thereby reduce the negative pressure. It is not thought that the particular spoiler design is critical, but it is anticipated that the shape of the automobile will affect air-flow patterns, and some minimal experimentation may be needed to achieve the necessary flow disruption in specific cases.

Figure 3:
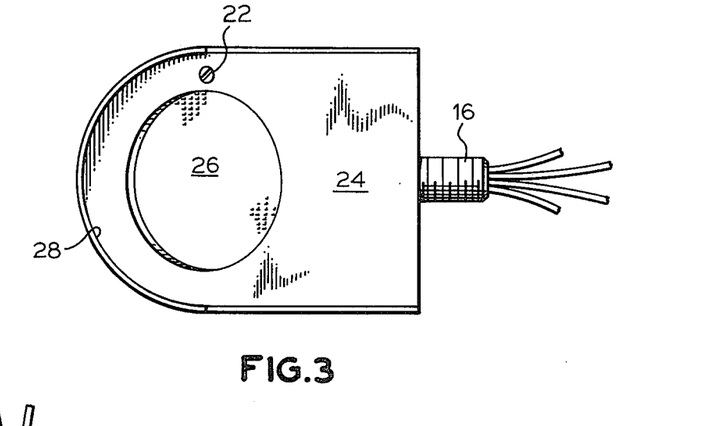
FIG. 3 is a side elevation of the transducer assembly of FIG. 2.

Each transducer is provided with a heating coil such as coil 25 that is used during cold weather to keep the temperature in the vicinity of diaphragm 26 high enough to prevent the transducer from icing up. An adjusting screw 22 is depicted in FIG. 3 to indicate that the orientations of the transducers can be made adjustable if such adjustment is desired.

Figure 5:
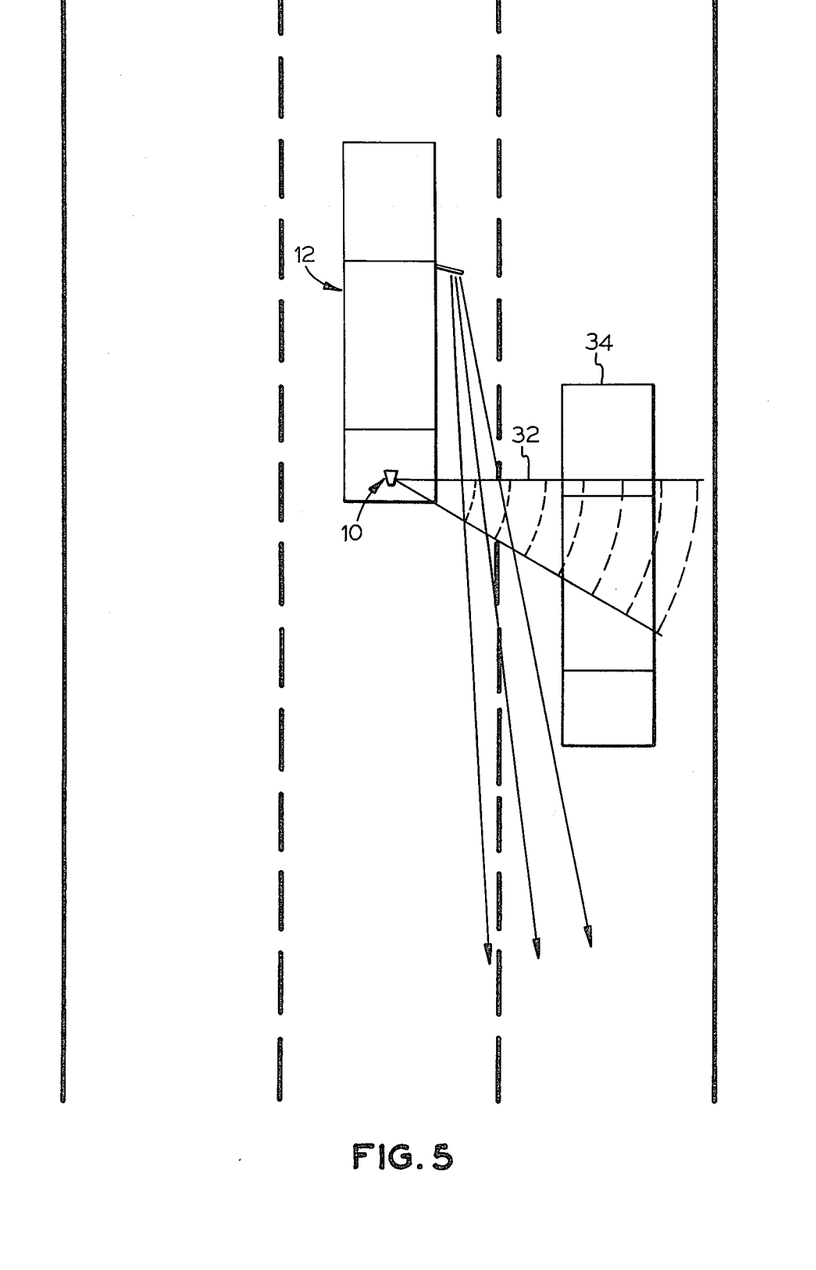
FIG. 5 is a diagrammatic presentation of the target region of one of the transducers of the transducer assembly of FIG. 1.

The transducers are so oriented that they are aimed into target regions such as that exemplified in FIG. 5 by target region 32. FIG. 5 illustrates that, even with a right-hand outside rear-view mirror, blind spots can be left. Such blind spots, of course, depend on the design of the car, the types of rear-view mirrors provided, and even the driver's height. Accordingly, the configuration of the target region will differ for different vehicles, and no exact specifications for the target region are suggested here. Of course, the system is not limited in applicability to covering "blind spots," and further transducers could be provided that are aimed into regions that are totally visible to the driver. Nonetheless, it is thought that the target region of at least one transducer should include enough of the "blind spot" region so that a car 34 in that region will be detected. Within this target region, no significant ultrasonic intensity should be present at the pavement, because the system would otherwise report the presence of objects in the target region when the only "object" is the pavement itself. In the region beyond the target region, on the other hand, the ultrasound beam should reach the ground. The reason for this will be explained in more detail below; it suffices at this point to say that detection of the ground beyond the target region is used to test the system.

The illustrated embodiment is so arranged that connection of the circuitry for driving the transducers can be made almost entirely to existing automobile circuitry at the car's rear. In most cars, lines between the front and the back of the automobile will only need to be provided to bring power from the car's voltage source (i.e., the battery/alternator system) to the circuitry at the rear and to transmit signals from the circuitry in the rear to, for instance, a buzzer or alarm lamp in the car interior.

FIG. 6 illustrates the connection of the system circuitry to the automobile's electrical system. The symbols within dashed lines 40 are a simplified representation of a portion of the existing automobile circuitry, while the symbols within dashed lines 72 represent the additional circuitry required for operation of the illustrated embodiment of the invention.

A voltage source 42 is shown connected through a bimetallic flasher switch 44 to a turn-signal switch 46. Turn signal switch 46 is operated by manual movement of the car's turn-signal lever. It can be operated from its neutral state 50 to left-turn and right-turn states in which it applies actuating signals to left signal lamp 54 and right signal lamp 56 along left and right signal lines 48 and 52, respectively. Of course, most automobiles include more turn-signal lamps than the two illustrated in FIG. 6, but only two are shown in FIG. 6 for the sake of simplicity.

When the driver operates his turn-signal lever to signal a left turn, for instance, a circuit is completed from voltage source 42 through switches 44 and 46 along left signal line 48 through left signal lamp 54 to ground. Current accordingly flows, causing left signal lamp 54 to shine and heating up the bimetallic element in flasher switch 44. After a short time, the different rates of expansion of the two metals in the bimetallic switch cause it to click open, interrupting the flow of current through lamp 54 and shutting it off. The interruption of current also permits the bimetallic element to cool down, and it soon clicks back to its closed position, beginning the cycle over again. Accordingly, the turn signal blinks.

Preferably, signal lamps 54 and 56 are the rear turn-signal lamps, so signal lines 48 and 52 extend to the rear of the automobile. Accordingly, the circuitry of the object-detection system can tap into these signal lines in the rear of the automobile to detect the presence of activating signals on them. Such a provision is illustrated in FIG. 6 by left and right relay coils LR and RR. When left signal lamp 54 is caused to shine, the coil of left relay LR is energized, and when lamp 54 is extinguished, LR is deenergized. In a similar manner, relay RR follows the activation and deactivation of right signal lamp 56.

The typical automobile system provides a supply voltage of around twelve volts, but the circuit of the illustrated embodiment predominantly operates on a regulated six volts, so a power supply 58 is provided that receives power from the automobile voltage source and provides it in turn as a regulated six volts to various other circuit components. In particular, it applies the six volts to circuitry 62, which includes various triggering and timing circuitry as well as the drive circuitry for driving left and right transducers 30 and 27, respectively. It also includes the circuitry for detecting echoes received from the transducers, and it includes a buzzer that is activated in response to such echoes.

The timing of the transmission of ultrasonic pulses is determined by a clock 60 whose output periodically triggers circuit 62. In the specific arrangement of FIG. 6, clock 60 is connected to power supply 58 through normally open contacts of LR and RR wired in parallel. Accordingly, clock 60 only provides its timing pulses to circuit 62 while one or the other of the signal lamps is illuminated. In the alternative, a monostable multivibrator could be interposed between clock 60 and the contacts of LR and RR to insure a minimum activation time for the clock and thereby reduce the effects of the variations in on time between the flasher systems of different automobiles.

It was previously indicated that each transducer is provided with a heating coil 32 (FIG. 4) to prevent the accumulation of ice about the diaphragm. A separate circuit for the heaters is shown in FIG. 6, the heaters being represented by block 66. A voltage-controlled relay is connected across the automobile voltage source to sense the potential difference across it. This potential difference is typically higher while the engine is running than when it is not running, and the voltage-controlled relay (VCR) is energized only while the engine is running. When it is energized, it closes the normally open contacts in the heater circuit, thereby warming the region around the transducer diaphragms. When the engine is turned off, the relay contacts open so that the heater does not draw current from the battery. Another normally open contact pair of VCR controls the flow of current to power supply 58, so the remaining circuitry is also turned off with the engine. Alternately, the circuits could be connected through the ignition switch to avoid the current drain caused by the voltage-controlled relay. A switch by which the heater circuit can be disconnected during warm weather would ordinarily be provided, although none is shown in the drawings.

A perusal of FIG. 6 reveals that power is applied to most of the circuitry whenever the engine is running. Only clock 60 and relays LR and RR do not receive power immediately. However, as will be apparent during the discussion of FIG. 7, transmission and reception of signals only occur in response to application of power to clock 60. Accordingly, the circuitry remains ready as long as the engine runs, but operation of the ultrasonic transducers only occurs upon operation of the turn signals.

FIG. 7 is a detailed block diagram of the circuitry of FIG. 6 represented by blocks 27, 30, 60, and 62. The system of FIG. 7 may be thought of as including three parts: the transducers, an alarm portion that includes OR gate 88 and those elements disposed to the right of it in FIG. 7, and a signal-processing portion. The signal-processing system applies excitation signals to transducers 74 (equivalent to blocks 27 and 30 of FIG. 6), which emit pulses of ultrasound and then detect ultrasonic echoes, transforming them into electrical signals that are received in the signal-processing system. Depending on the timing of the echoes, the signal-processing system may cause the alarm system to respond, driving a buzzer that is audible to the driver. Of course, lights, bells, and other such alarm devices could also be employed.

Among the elements of the signal-processing system are those represented by blocks 60 and 78, which are labeled "clock" and "signal processing circuit." These and transducers 74 are provided in the illustrated embodiment by a device produced by the Polaroid Corporation and sold as its "Ultrasonic Ranging Unit." This circuitry is operable to drive transducer 74 so as to emit an ultrasonic "chirp" that lasts for one millisecond and consists of four ultrasonic frequencies in succession. Eight cycles of 60 kHz are followed by eight cycles of 57 kHz, sixteen cycles of 53 kHz, and twenty-four cycles of 50 kHz. The use of several frequencies enables targets to be detected that might otherwise be missed due to interference or absorption by the target at a specific frequency. After transmission of the ultrasonic pulse, the circuit "listens" for electrical signals produced by transducer 74 in response to echoes reaching the transducers. Since the ultrasound is greatly attenuated with distance, the circuit is so arranged that its gain increases as time elapses after initial transmission of the ultrasound pulse. This allows detection of signals from significant distances while avoiding processing of unnecessary noise.

When the first echo is received after each transmitted pulse, a first-echo signal is produced by circuitry 78. This is fed, as FIG. 7 shows, to an AND gate 90, whose function will be described below.

In addition to providing the signal for driving the transducers, circuitry 78 also provides a low-voltage version of the same signal, which is transmitted to a monostable (one-shot) multivibrator 82.

The alarm 98 is arranged so that it is driven when a first-echo signal and an enablement signal are simultaneously received by AND gate 90. OR gate 88 provides such a signal when it receives an enablement signal at either or both of its input ports. These enablement signals are produced by preset one-shot 82, 30-second one-shot 80, 400-millisecond one-shot 86, and their associated circuitry. The purpose of this circuitry is ordinarily to cause the alarm to sound only when echoes from objects in the target region are detected, but it also provides a test mode in which the alarm is sounded even when echoes from outside the target region are detected.

Preset one-shot 82 is set so that its unstable state has a period that is equal to the round-trip time for ultrasound to go from the transducers to the end of the target region and back again. When it receives a transmit signal, indicating that an ultrasound pulse has been sent, it is triggered, assuming its unstable state for the preset period. Accordingly, during the preset period, it provides an enablement signal as an input to OR gate 88, which accordingly provides an enabling output as one of the inputs to AND gate 90. If a first-echo signal is received as the other input to AND gate 90 during the time that this enablement signal is present, a trigger signal is supplied at the input port of one-millisecond one-shot 92, which in turn triggers 500 millisecond one-shot 94, causing it to energize an alarm driver 96 to sound alarm 98 for half a second.

In addition to providing its output as an input to OR gate 88, preset one-shot 82 also provides its output signal to an input port of AND gate 84. Ordinarily, however, AND gate 84 is disabled because 30-second one-shot 80, from which it receives its other input, is usually in its unstable state, which it maintains for 30 seconds. Accordingly, the presentation by preset one-shot 82 of a signal to gate 84 does not usually result in an output of gate 84 to trigger 400-millisecond one-shot 86. Usually, therefore, 400-millisecond one-shot 86 provides no input to OR gate 88, and the output of OR gate 88 is accordingly equivalent to the output of preset one-shot 82. Transmission of an ultrasound pulse therefore results in triggering of one-shot 82, which causes gate 90 to "listen" for first-echo signals only for a time that is long enough to permit the ultrasound to travel from the transducer to the end of the target region and back again. After that, preset one-shot 82 reassumes its stable state, and subsequent first-echo signals do not cause an output from AND gate 90 to activate the alarm until after the next ultrasonic-pulse transmission. Therefore, during ordinary operation, the alarm only sounds when echoes are received from objects within one of the target regions.

However, the operation is somewhat different when the turn signal is first operated. When the turn signal is first operated, the circuitry has typically been at rest for a significant amount of time, and all of the one-shots are in their stable states, including 30-second one-shot 80. Accordingly, the first transmit signal, which triggers preset one-shot 82, causes it to trigger 400-millisecond one-shot 86. This is because 30-second one-shot 80 is in its stable state, and the complement of this output is applied as the other input to AND gate 84, enabling it to pass along the output from one-shot 82. As a result, 400-millisecond one-shot 86 presents an input to OR gate 88 for 400 milliseconds. This is much longer than the period of preset one-shot 82, and it is long enough for ultrasound signals to travel beyond the end of the target region to reach the ground outside the target region and to bounce back to the transducer. Accordingly, the transmission of the first ultrasound pulse results in actuation of alarm 98 because AND gate 90 "listens" for a first-echo signal for a time long enough to permit detection of the inevitable echo from the ground beyond the target region.

On subsequent transmissions, however, 400-millisecond one-shot 86 is not triggered. When it is triggered on the first transmission, its output is fed not only to OR gate 88 but also to 30-second one-shot 80. In its stable state, 30-second one-shot 80 permits preset one-shot 82 to trigger 400-millisecond one-shot 86. However, assumption by 400-millisecond one-shot 86 of its unstable state triggers 30-second one-shot 80, causing it to assume its unstable state. AND gate 84 is thereby disabled, and further triggering of 400-millisecond one-shot 86 is prevented. After the first actuation of alarm 98 in response to detection of the ground beyond the target region, therefore, alarm 98 can only be actuated during the next thirty seconds if objects are detected within the target region. Accordingly, when the driver first turns on the turn signal, he hears the alarm, which reassures him that the information system is working properly. He will then have confidence that no objects are within the target region if there is no buzzing after the first half second. Without such an arrangement, the driver might be inclined to second-guess the system, and its usefulness to him would be greatly reduced.

Figure 8:
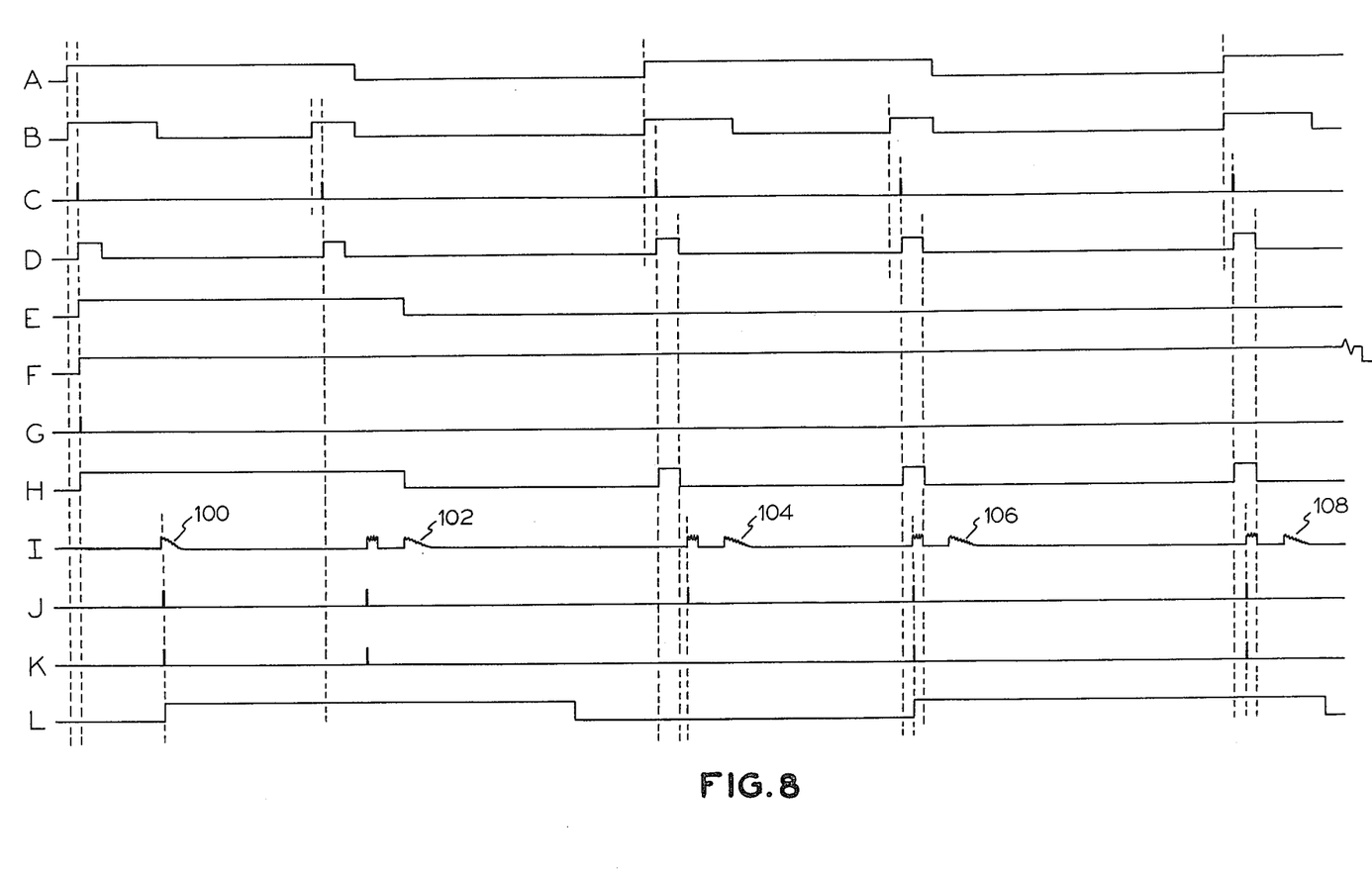
FIG. 8 is a timing diagram showing simplified versions of the waveforms at various points in FIGS. 6 and 7.

The time relationships between the signals at the various points in FIGS. 6 and 7 are depicted in FIG. 8, in which simplified waveforms are labeled with letters that mark the associated points in the circuits of FIGS. 6 and 7.

Waveform A represents the signal applied to clock 60 when a turn signal is turned on, its leftmost leading edge representing an initial actuation after an extended period during which the turn signals have not been used. The high portions of the waveform represent the times during which switch 44 is closed, and its low portions represent the times during which it is open.

Waveform B represents the output of clock 60. In the particular embodiment illustrated in the drawings, clock 60 has an on time of 100 milliseconds and an off time of 200 milliseconds for a total period of 300 milliseconds. Accordingly, the clock has a frequency of 3.33 Hz. At the point at which the turn signal is operated, represented by the leftmost leading edge of waveform A, the input signal to clock 60 rises, as is illustrated by waveform A, and clock 60 accordingly begins to operate, a waveform B illustrates. The signal is initially high for 100 milliseconds and then goes low for 200 milliseconds, after which it again goes high to start another 100-millisecond pulse. However, in the example illustrated in FIG. 8, the signal at point A goes low with the opening of bimetallic switch 44, and the clock output therefore also goes low before completing a 100-millisecond pulse. When wavform A subsequently goes high, the clock output, waveform B, also goes high and operates as before.

In the illustrated example, waveform A has a 700-millisecond period with a 50-percent duty cycle. Of course, the period and duty cycle of the flasher switch will vary from car to car, but those skilled in the art will recognize that the timing provided by the remainder of the circuit components will operate over a wide range of turn-signal frequencies. Nonetheless, it may be found desirable, as was mentioned above, to interpose a one-shot in the circuit ahead of clock 60. A one-shot whose duration is, say, one second would hold the clock in operation for a predictable amount of time and therefore avoid any difficulties that might result from an unexpectedly short flasher-switch duty cycle.

Circuit 78 responds to the leading edge of clock output signal B by applying an excitation signal to transducers 74 through switching represented in FIG. 7 by block 76 and shown in FIG. 6 as contacts LR and RR in the left and right transducer circuits. The particular circuit used in the preferred embodiment does not respond immediately to the triggering, and there is a delay between the triggering and the application of the excitation signal that is not very repeatable. This delay is seen in waveform C of FIG. 8, which represents the transmit signal, the lower-voltage replica of the excitation signal applied to the transducers. In FIG. 8, the transmit signal is only seen as a pulse with negligible duration because the excitation signal only lasts for one millisecond, but an expanded view would reveal that this signal is the one-millisecond chirp of four frequencies described above.

Waveform C shows that the excitation pulse occurs a short time after every leading edge of the clock pulse (waveform B). Accordingly, the excitation pulses are produced at 300-millisecond intervals while the turn signal is on. However, since no excitation pulses are produced while the turn signal is off, the average frequency of excitation-signal transmission is somewhat lower than the nominal 3.33-Hz frequency of clock 60.

As FIG. 7 shows, the transmit signal is provided as the input to preset one-shot 82, whose output is depicted in FIG. 8 as waveform D. The duration of the unstable state of one-shot 82 determines the size of the target region. It is initially adjusted for a particular automobile to optimize the effectiveness of the system by setting the size of the target region so that it detects objects that are to be avoided without setting off the alarm unnecessarily. In FIG. 8, this period is shown arbitrarily as 25 milliseconds. Waveform D represents the ! ordinary "listening" time of the circuit; after each excitation pulse (waveform C), a 25-millisecond "window" is provided during which echoes received at the transducer will cause the alarm to sound.

Although the ordinary "listening" time is 25 milliseconds, the circuit "listens" for a somewhat longer time when the turn signal is initially operated. This longer time interval is set by the output of 400-millisecond one-shot 86, which is depicted in FIG. 8 by waveform E. As waveform E shows, there is an initial 400-millisecond duration that occurs after the first excitation signal, but subsequent excitation signals do not cause one-shot 86 to turn on. This operation can best be understood by review of waveforms F and G. Waveform F is the output of 30-second one-shot 80, which is triggered by the output of 400-millisecond one-shot 86 (waveform E). The complement of waveform F is ANDed in gate 84 with the output of preset one-shot 82 to provide a trigger signal (waveform G) for 400-millisecond one-shot 86.

When the turn-signal lever is first operated, 30-second one-shot 80 is in its stable state, as waveform F shows, and, when ANDed with waveform D, it produces a high signal (waveform G) as the input to one-shot 86. However, the output of one-shot 86 (waveform E) immediately goes high in response, and one-shot 80 is thereby caused to assume its unstable state. The complement of its output accordingly goes low, so waveform G does, too. The duration of the pulse of waveform G is therefore very short, only being equal to the time required for propagation of signals following the path from gate 84 through one-shots 86 and 80 and back through gate 84. Since 30-second one-shot 80 remains in its unstable state for 30 seconds, no more pulses are present in waveform G for the next 30 seconds, a time which is typically longer than the time during which the turn signal is activated for any one turn. If the driver keeps his turn signal on for more than 30 seconds, he has probably forgotten that it is on, and reassumption by one-shot 80 of its stable state will cause the alarm to go off, thereby reminding the driver that his turn signal is on.

It is thought that selection of the period for one-shot 80 will be modified as the result of experience. The period of this one-shot should be short enough so that it recovers its stable state before the next operation of the turn signal. On the other hand, it should be long enough so that it does not ordinarily resume its stable state before the turn-signal lever resumes its neutral position.

Waveform H represents the output of OR gate 88, which receives enable signals from both the test one-shot 86 and the non-test one-shot 82. It therefore provides an output whenever an enable signal is received from either of those one-shots, and it represents the "listen" time of the circuit. Initially, there is a 400-millisecond period during which the circuit "listens" for echoes from beyond the target region. Subsequently, the "listen" times are only 25 milliseconds long because the circuit is only "listening" for echoes from objects within the target region.

Waveform I represents the electrical signals produced by the transducer in response to ultrasonic echoes. In actuality, both the excitation signals and the electrical signals produced in response to echoes travel along the same lines, but the excitation signals are not shown in waveform I. An echo 100 is shown in waveform I to represent an echo from the ground or other objects beyond the target region. Circuit 78 responds to echo signal 100 by producing a first-echo pulse depicted in waveform J. By comparison of waveform D to waveforms I and J, it is clear that echo 100 is not produced by objects within the target region. Nonetheless, gate 90 produces an output, depicted in waveform K, because an enable signal (waveform H) is present as the other input to gate 90. As a result, 500-millisecond one-shot 94 is turned on to present an output (waveform L) that drives the alarm and notifies the driver that the system is working properly.

After the next excitation pulse (waveform C), two echo signals are received, the first one being labeled with reference numeral 102 Circuit 78 accordingly generates a first-echo signal to represent the occurrence of the first echo after the most recent excitation signal. Since it only responds to the first echo after each excitation signal, no signal is produced in response to the next echo. The first-echo signal is shown in waveform J, and an output of gate 90 (waveform K) is produced because an enable signal (waveform H) is still present at its other input port. However, this has no effect on the alarm, since 500-millisecond one-shot 94 is still timing out its half-second period.

The occurrence of the third excitation pulse (waveform C) results in an echo signal 104 in waveform I that causes a first-echo pulse in waveform J. However, this first-echo pulse results from an object outside the target region, as comparison with waveform D reveals, and it occurs after test one-shot 86 has timed out, as waveform E shows. Therefore there is no enablement signal (waveform H) present when the first-echo signal occurs. As a result, no output (waveform K) is produced by gate 90, and the alarm, which has now turned off, is not reactivated.

In response to the fourth excitation signal (waveform C), an echo signal 106 (waveform I) occurs that results from an object within the target region. Accordingly, the resultant first-echo signal (waveform J) coincides with an enabling pulse (waveform H), causing an output of gate 90 (waveform K) that causes one-shot 94 to turn on and drive alarm 98. The driver of the car is accordingly notified that there is an object within the target region.

The next excitation signal causes another echo 108, which indicates that the object remains inside the target region. This detection has no effect, because 500-millisecond one-shot 94 is still timing out. Accordingly, the sound from the alarm buzzer will have momentary interruptions that occur between the end of the unstable state of one-shot 94 and the reception of the next echo signal.

In view of the foregoing description, it is apparent that an information system that provides significant advantages can be provided by following the teachings of the present invention. By providing a spoiler for air-flow disruption adjacent to the transducer, a diaphragm-type transducer can be used at high automobile speeds, and a plurality of frequencies can accordingly be transmitted to reduce the effects of any selective absorption or interference by objects in the target region. The system is turned on only when the turn signal is, so the information is presented to the driver only when he is in need of it. The circuit is connected to the existing signal line between the turn-signal switch and the signal lamps, and the necessity is avoided for additional mechanical devices to couple the turn-signal lever to the circuitry for the information system. Furthermore, the circuitry is so arranged that a self test is performed at each use, thereby reinforcing the confidence of the driver in the information received from the system.

It is important in any information system that the information presented not only be accurate but also be presented in such a form that the human user is likely to respond to it. By so arranging the system that the information is only presented when the turn signal is on and is so presented that the driver has confidence in it, the system of the present invention fulfills these objectives.

Having thus described the invention, we claim:

1. In an automobile having left and right turn-signal lamps connected by left and right signal lines, respectively, to a manual turn-signal activation device having a neutral state and left-turn and right-turn states in which it applies actuating signals to the left and right signal lamps, respectively, along the left and right signal lines, an ultrasonic object-detection device comprising:

a. ultrasonic signal means selectively operable to transmit ultrasonic pulses into left and right target regions disposed to the left- and right-hand sides of the automobile, respectively, to detect echoes of said pulses from objects in the left and right target regions and to generate electrical echo-reception signals to indicate the reception of ultrasonic echoes, said ultrasonic signal means including means electrically connected for operation upon transmission of actuating signals on said left and right signal lines to transmit ultrasonic pulses that travel through the target regions without reaching the ground and that reach the ground after traveling beyond the target regions, said ultrasonic signal means receiving ultrasonic echoes of said ultrasonic pulses and producing electrical echo-reception signals representing the time of reception of the ultrasonic echoes;

b. alarm means electrically connected for reception of the echo-reception signals from said ultrasonic signal means and operable in response to the echo-reception signals to present an alarm signal to a driver of the automobile, said alarm means including an alarm indication to the driver of the automobile in response to the echo-reception signals only upon application of enablement signals thereto;

c. circuit means electrically connected to the left and right signal lines for detecting actuating signals thereon and operating said ultrasonic signal means to transmit ultrasonic pulses to the left target region when actuating signals are transmitted on the left signal lines and to transmit ultrasonic pulses to the right target region when actuating signals are transmitted on the right signal line, said alarm means thereby notifying the driver of the presence of objects in the right target region during the period of time the turn-signal switching device has been operated to its right-turn state and notifying the driver of the presence of objects in the left target regions during the period of time the turn-signal switching device has been operated to its left-turn state, said circuit means being operable upon movement of said activation device into left-turn and right-turn states and continuing in operation during the time said switching device is in its left-turn and right-turn states.

2. The ultrasonic object-detection device of claim 1 wherein said ultrasonic signal means includes left and right transducer means and signal-processing means electrically connected to said transducer means for selective excitation of and reception of signals from said transducer means, said circuit means for detecting actuating signals including left and right relays electrically connected to said left and right signal lines, respectively, for actuation of said left and right relays upon transmission of actuating signals on said left and right signal lines, respectively, said signal-processing means including contacts of said left and right relays, said left and right relay contacts being operable by actuation of said left and right relays, respectively, to permit signal transmission between said signal-processing means and said left and right transducers, respectively, and by deactivation of said left and right relays to prevent signal transmission between said signal-processing means and said left and right transducers, respectively.

3. The ultrasonic object-detection device of claim 2 wherein said signal-processing means includes clock means for producing pulses at regular intervals when enabled, said ultrasonic signal means transmitting an ultrasonic pulse on each pulse of said clock means, said clock means being electrically connected for enablement thereof by operation of said manual activation device.

4. In an automobile having left and right turn-signal lamps connected by left and right signal lines, respectively, to a manual turn-signal activation device having a neutral state and left-turn and right-turn states in which it applies actuating signals to the left and right signal lamps, respectively, along the left and right signal lines, an ultrasonic object-detection device comprising:

a. ultrasonic signal means selectively operable to transmit ultrasonic pulses into left and right target regions disposed to the left- and right-hand sides of the automobile, respectively, to detect echoes of said pulses from objects in the left and right target regions and to generate electrical echo-reception signals to indicate the reception of ultrasonic echoes, said ultrasonic signal means including means electrically connected for operation upon transmission of actuating signals on said left and right signal lines to transmit ultrasonic pulses that travel through the target regions without reaching the ground and that reach the ground after traveling beyond the target regions, said ultrasonic signal means receiving ultrasonic echoes of said ultrasonic pulses and producing the electrical echo-reception signals representing the time of reception of the ultrasonic echoes;

b. alarm means electrically connected for reception of the echo-reception signals from said ultrasonic signal means and operable in response to the echo-reception signals to presetn an alarm signal to a driver of the automobile; said alarm means including an alarm indication to the driver of the automobile in response to the echo-reception signals only upon application of enablement signals thereto;

c. circuit means electrically connected to the left and right signal lines for detecting actuating signals thereon and operating said ultrasonic signal means to transmit ultrasonic pulses to the left target region when actuating signals are transmitted on the left signal line and to transmit ultrasonic pulses to the right target region when actuating signals are transmitted on the right signal line, said alarm means thereby notifying the driver of the presence of objects in the right target region when the turn-signal switching device has been operated to its right-turn state and notifying the driver of the presence of objects in the left target region when the turn-signal switching device has been operated to its left-turn state, said circuit means being operable upon movement of said activation device into left-turn and right-turn states; and d. enablement means, having test and non-test modes, for assuming its test mode in response to operation of said manually operable activation device to activate a signal lamp and for thereafter automatically assuming its non-test mode, said enablement means being electrically connected for application of enablement signals to said alarm means and applying, in response to transmission of ultrasound pulses, an enablement signal to said alarm means that continues long enough during said test mode to enable said alarm means to present an alarm indication to the driver of the automobile in response to electrical echo-reception signals resulting from echoes from the ground outside the target region, said enablement means applying, in response to transmission of ultrasound pulses, enablement signals to said alarm means that only last long enough during said non-test mode to enable said alarm means to present an alarm indication to the driver of the automobile in response to electrical echo-reception signals resulting from echoes from objects within the target region, said alarm means thereby presenting an alarm indication to the driver of the automobile during said test mode whenever a pulse is transmitted and said ultrasonic device is working properly, said alarm means thereby only presenting an alarm indication to the driver of the automobile during said non-test mode when an echo is received from an object in the test regions.

5. The ultrasonic object-detection device of claim 4 wherein said ultrasonic signal means includes left and right ultrasonic transducer means for transmitting ultrasound into and receiving ultrasound back from the left and right target regions, respectively, said circuit means for detecting actuating signals further including right and left relay means connected to said right and left signal lines, respectively, for activation upon transmission of activating signals along said right and left signal lines, respectively, said ultrasonic signal means including contacts of said left and right relays in circuit with said left and right transducers, respectively, for connection of said left and right transducers, respectively, upon activation of their respective relays for driving thereof and reception of signals therefrom, deactivation of said left and right relays interrupting the connection to said left and right transducers, respectively.

6. In an automobile having at least one signal lamp for indicating a direction in which the automobile is to be driven and including a manual activation device manually operable to selectively activate the signal lamp, an ultrasonic device for detecting the presence of objects in a target region associated with the indicated direction comprising:

a. ultrasonic transmitter/receiver means connected for operation by said activation device to transmit ultrasonic pulses that travel through the target region without reaching the ground and that reach the ground after traveling beyond the target region, said transmitter/receiver means receiving ultrasonic echoes of said ultrasonic pulses and producing electrical echo-reception signals representing the time of reception of the ultrasonic echoes;

b. alarm means electrically connected to receive said echo-reception signals and operable by application of enablement signals thereto to present an alarm indication to the driver of the automobile in response to the electrical echo-reception signals; and c. enablement means, having test and non-test modes, for assuming its test mode in response to operation of said manually operable activation device to activate the signal lamp and for thereafter automatically assuming its non-test mode, said enablement means being electrically connected for application of enablement signals to said alarm means and applying, in response to transmission of ultrasound pulses, an enablement signal to said alarm means that continues long enough during said test mode to enable said alarm means to present an alarm indication to the driver of the automobile in response to electrical echo-reception signals resulting from echoes from the ground outside the target region, said enablement means applying, in response to transmission of ultrasound pulses, enablement signals to said alarm means that only last long enough during said non-test mode to enable said alarm means to present an alarm indication to the driver of the automobile in response to electrical echo-reception signals resulting from echoes from objects within the target region, said alarm means thereby presenting an alarm indication to the driver of the automobile during said test mode whenever a pulse is transmitted and said ultrasonic device is working properly, said alarm means thereby only presenting an alarm indication to the driver of the automobile during said non-test mode when an echo is received from an object in said target region.

7. The ultrasonic echo-reception device of claim 6 wherein said enablement means includes a non-test monostable multivibrator connected for triggering upon pulse transmission and having a period equal to the time required for sound to travel from said transmitter/receiver means to the end of the target region and back again, the output port of said non-test monostable multivibrator being electrically connected for application of its output to said alarm means as an enablement signal.

8. The ultrasonic device of claim 7 wherein said enablement means includes a test monostable multivibrator having an output port connected for application of its output as an enablement signal to said alarm means, said enablement means further including a timing monostable multivibrator whose unstable state has a period extending through a plurality of ultrasound pulses, said timing monostable multivibrator being connected for reception as its input the output of said test monostable multivibrator, the input port of said test monostable multivibrator being connected for reception as its input the outputs of said non-test and timing monostable multivibrators gated for triggering of said test monostable multivibrator by the output of said non-test monostable multivibrator only during the stable state of said timing multivibrator, the period of said test monostable multivibrator being long enough to enable said alarm means to present an alarm indication in response to electrical echo-reception signals resulting from echoes from the ground outside the target regions, initial triggering of said non-test monostable multivibrator thereby triggering said test monostable multivibrator to enable response of said alarm means to echoes from beyond the target region, but the output of said test monostable multivibrator thereby triggering said timing monostable multivibrator to prevent further triggering of said test monostable multivibrator and activation of said alarm means in response to signals from beyond the target region until said timing monostable multivibrator resumes its stable state to again permit response of said alarm means to echoes from beyond the target region to remind the driver that said signal lamp is still activated.

9. The ultrasonic object-detection device of claim 6 wherein said ultrasonic transmitter/receiver means includes clock means for producing pulses at regular intervals when enabled, said transmitter/receiver means transmitting an ultrasonic pulse on each pulse of said clock means, said clock means being electrically connected for enablement thereof by operation of said manual activation device.

10. The ultrasonic device of claim 6 wherein said test means is electrically connected for reception of enablement signals from said enablement means and applies its enablement signals to said alarm means in response to enablement signals from said enablement means, testing in said test mode thereby including testing of said enablement means.

11. An ultrasonic object-detection device for an automobile comprising:
 a. ultrasonic signal means selectively operable to transmit ultrasonic pulses into left and right target regions disposed to the left- and right-hand sides of the automobile, respectively, to detect echoes of said pulses from objects in the left and right target regions and to generate electrical echo-reception signals to indicate the reception of ultrasonic echoes, said ultrasonic signal means including means electrically connected for operation upon transmission of actuating signals on said left and right signal lines to transmit ultrasonic pulses that travel through the target regions without reaching the ground and that reach the ground after traveling beyond the target regions, said ultrasonic signal means receiving ultrasonic echoes of said ultrasonic pulses and producing the electrical echo-reception signals representing the time of reception of the ultrasonic echoes; said ultrasonic signal means including ultrasonic transducer means mounted on the automobile, diaphragm means, and operable by application of excitation signals thereto to vibrate said diaphragm means at ultrasonic frequencies to produce ultrasound waves, said diaphragm means vibrating in response to reception thereat of ultrasound echoes, said transducer means generating echo electrical signals in response to such vibration;
 b. alarm means operable by application of electrical signals thereto to present an alarm indication to the driver of the automobile, said alarm means including an alarm indication to the driver of the automobile in response to the echo-reception signals only upon application of enablement signals thereto;
 c. signal-processing means electrically connected to said transducer means for application of electrical excitation signals thereto and reception of electrical echo signals therefrom and electrically connected to said alarm means for application of elecrical signals thereto, said signal-processing means applying excitation signals to said transducer means to produce ultrasound waves at a plurality of ultrasonic frequencies and, upon reception of at least some echo electrical signals from said transducer means, applying electrical signals to said alarm means to present an alarm indication to the driver of the automobile;
 d. air-flow disruption means mounted on said automobile adjacent said diaphragm means and positioned for avoidance of negative pressure on said diaphragm means caused by rapid air flow resulting from motion of said automobile; and
 e. means for coupling said signal processing means to the turn signal circuit of the automobile for operation upon activation of the turn signal circuit.

12. An ultrasonic object-detection device for an automobile comprising:
 a. an alarm means operable by application of electrical signals thereto to present an alarm indication to the driver of the automobile;
 b. ultrasonic transducer means mounted on the automobile, including diaphragm means, and being operable by application of excitation signals thereto to vibrate said diaphragm means at ultrasonic frequencies to produce ultrasound waves, said diaphragm means vibrating in response to reception thereat of ultrasound echoes, said transducer means generating echo electrical signals in response to such vibration;
 c. signal-processing means electrically connected to said transducer means for application of electrical excitation signals thereto and reception of electrical echo signals therefrom and electrically connected to said alarm means for application of electrical signals thereto, said signal-processing means applying excitation signals to said transducer means to produce ultrasound waves at a plurality of ultrasonic frequencies and, upon reception of at least some echo electrical signals from said transducer means, applying electrical signals to said alarm means to present an alarm indication to the driver of the automobile;

d. air-flow disruption means mounted on said automobile adjacent said diaphragm means and positioned for avoidance of negative pressure on said diaphragm means caused by rapid air flow resulting from motion of said automobile; and e. heater means disposed adjacent said diaphragm means and operable to maintain the temperature in the vicinity of said diaphragm means high enough to keep said diaphragm means free of ice.

13. The ultrasonic object-detection device of claim 12 wherein said heater means is connected to the electrical system of the automobile for powering of said heater means by the automobile voltage source, said heater means including voltage-sensing means for sensing the voltage level of the automobile voltage source, said heating means heating the region of said diaphragm means only when said sensing means detects a voltage indicating that the automobile engine is running.

14. The ultrasonic object-detection device of claim 11 wherein said diaphragm means is driven electrostatically.

15. A method of ultrasonically detecting the presence of objects within a target region in the vicinity of an automobile comprising the steps of:

a. providing ultrasonic transmitter/receiver means operable to transmit ultrasonic pulses that travel through the target region without reaching the ground and that reach the ground after traveling beyond the target region, the transmitter/receiver means receiving ultrasonic echoes of the ultrasonic pulses and producing electrical echo-reception signals representing the time of reception of the ultrasonic, echoes;

b. providing alarm means electrically connected for reception of said echo-reception signals and operable to present an alarm indication to the driver of the automobile in response to electrical echo-reception signals occurring within a first duration after transmission of said ultrasonic pulses that is equal to the time required for sound to travel from said transmitter/receiver means to the end of the target region and back again, said alarm means also being operable to present an alarm indication to the driver of the automobile in response to electrical echo-reception signals that occur within a second duration after pulse transmission that is long enough for the ultrasound pulse to travel from the transmitter/receiver means to the ground outside the target region and back again;

c. operating said transmitter/receiver means and said alarm means for transmission of an ultrasonic pulse and presentation of an alarm indication upon reception of an echo within the second time duration, an alarm thereby being presented to the driver of the automobile if the transmitter/receiver means and the alarm means are working properly; and d. thereafter operating said transmitter/receiver means and said alarm means for transmission of a pulse and presentation of an alarm only upon reception of an echo within the first time duration, the transmitter/receiver means and alarm means thereby being tested initially for proper operation and then operated to detect objects within the target region.

* * * * *